United States Patent
Naitou et al.

(10) Patent No.: US 7,528,521 B2
(45) Date of Patent: May 5, 2009

(54) ROTARY ELECTRIC MACHINE AND ELECTRIC WHEELCHAIR MOUNTED WITH ROTARY ELECTRIC MACHINE

(75) Inventors: Shinya Naitou, Shizuoka-ken (JP);
Haruyoshi Hino, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 333 days.

(21) Appl. No.: 11/488,976

(22) Filed: Jul. 19, 2006

(65) Prior Publication Data
US 2007/0020985 A1 Jan. 25, 2007

(30) Foreign Application Priority Data
Jul. 20, 2005 (JP) ............................. 2005-210497

(51) Int. Cl.
*H02K 1/22* (2006.01)
(52) U.S. Cl. ....................... 310/268; 310/257
(58) Field of Classification Search ................. 310/268, 310/254, 256, 257
See application file for complete search history.

(56) References Cited

U.S. PATENT DOCUMENTS

| | | | |
|---|---|---|---|
| 4,551,645 | A | 11/1985 | Takahashi et al. |
| 4,719,377 | A | 1/1988 | Horie et al. |
| 4,998,032 | A | 3/1991 | Burgbacher |
| 5,142,178 | A | 8/1992 | Kloster et al. |
| 5,234,066 | A | 8/1993 | Ahsing et al. |
| 5,489,811 | A * | 2/1996 | Kern et al. ................... 310/216 |
| RE35,763 | E | 4/1998 | Burgbacher |
| 5,818,189 | A | 10/1998 | Uchiyama et al. |
| 6,157,112 | A | 12/2000 | Suzuki |
| 6,278,217 | B1 | 8/2001 | Kliman et al. |

(Continued)

FOREIGN PATENT DOCUMENTS

CN 1627596 A 6/2005

(Continued)

OTHER PUBLICATIONS

European Search Report, Application No. EP 06 01 5069, Mar. 22, 2007.

(Continued)

*Primary Examiner*—Hae Moon Hyeon
(74) *Attorney, Agent, or Firm*—Knobbe, Martens, Olson & Bear, LLP

(57) ABSTRACT

A rotary electric machine comprises a stator including a plurality of teeth which are wound up by coils and a stator yoke core connecting the respective teeth, and a rotor provided with magnets disposed so as to oppose to the teeth, respectively, with a space therebetween. Each of the teeth (tooth) is formed into T shape by laminating a plurality of magnetic steel plates and has a head portion and a leg portion, the head portion being a wider portion of the T-shape which is opposed to the magnet, the leg portion including a coil wind-up portion which has a substantially constant width and an insert portion which is inserted into the stator yoke core, and the coil wind-up portion is formed with a plurality of fitting portions for fitting and fixing the laminated magnetic steel plates together, the fitting portions being arranged so as to align along a center line of the coil wind-up portion.

10 Claims, 19 Drawing Sheets

U.S. PATENT DOCUMENTS

| | | |
|---|---|---|
| 6,407,472 B1 | 6/2002 | Takayanagi |
| 6,445,105 B1 | 9/2002 | Kliman et al. |
| 6,472,783 B1 * | 10/2002 | Witthohn et al. ........... 310/68 R |
| 6,717,324 B2 | 4/2004 | Chen |
| 6,809,453 B2 | 10/2004 | Narita et al. |
| 7,173,357 B2 * | 2/2007 | Naito et al. ............ 310/154.05 |
| 7,262,540 B2 * | 8/2007 | Lee ............................ 310/217 |
| 7,271,519 B2 * | 9/2007 | Lee ............................ 310/216 |
| 2003/0057796 A1 | 3/2003 | Fan et al. |
| 2004/0104638 A1 | 6/2004 | Yoneda et al. |
| 2004/0189137 A1 | 9/2004 | Hashimoto et al. |
| 2005/0017596 A1 | 1/2005 | Naito et al. |
| 2005/0073213 A1 | 4/2005 | Naito et al. |
| 2007/0018528 A1 * | 1/2007 | Naitou et al. ............... 310/218 |
| 2007/0018529 A1 * | 1/2007 | Naitou et al. ............... 310/218 |

FOREIGN PATENT DOCUMENTS

| | | | |
|---|---|---|---|
| EP | 1746703 A2 * | 1/2007 | |
| EP | 1746704 A2 * | 1/2007 | |
| EP | 1746705 A2 * | 1/2007 | |
| JP | 60152240 | 8/1985 | |
| JP | 10-126982 | 5/1998 | |
| JP | 11-18326 | 1/1999 | |
| JP | 11-146617 | 5/1999 | |
| JP | 11-318059 | 11/1999 | |
| JP | 2000-334001 | 12/2000 | |
| JP | 2003-224939 | 8/2003 | |
| JP | 2004-80944 | 3/2004 | |
| WO | WO 01/06623 | 1/2001 | |
| WO | WO 01/84696 A1 | 11/2001 | |
| WO | WO 2004/017488 | 2/2004 | |
| WO | WO 2004/030187 | 4/2004 | |

OTHER PUBLICATIONS

Office Action, EP 06 01 5069, Apr. 3, 2007.
Office Action received in U.S. Appl. No. 11/489,699 dated Nov. 17, 2008.
Non-final Office Action mailed Dec. 8, 2008 in U.S. Appl. No. 11/488,972.

* cited by examiner

PRIOR ART

PRIOR ART

PRIOR ART

ROTARY ELECTRIC MACHINE AND ELECTRIC WHEELCHAIR MOUNTED WITH ROTARY ELECTRIC MACHINE

CROSS-REFERENCE TO RELATED APPLICATIONS

The present application is based on and claims priority under 35 U.S.C. § 119 to Japanese Patent Application No. 2005-210497, filed on Jul. 20, 2005.

BACKGROUND OF THE INVENTION

1. Field of the Invention

The present invention relates to a rotary electric machine capable of suppressing an energy loss due to induction or induced current by improving teeth of a stator and also relates to an electric wheelchair (or electrically powered wheelchair) mounted with such rotary electric machine.

2. Related Art

In a known art, as such a rotary electric machine, there has been provided an axial gap type rotary electric machine as shown, for example, in FIGS. 16 to 19.

Referring to FIGS. 16 to 19, the rotary electric machine is provided with a stator 3 formed with teeth 2 and a rotor provided with a plurality of magnets (permanent magnets), not shown, in which the stator and the rotor are arranged with a gap in a rotation axis direction.

More in detail, the each tooth 2 is composed of a plurality of steel plates 2a laminated in a radial direction thereof for a countermeasure to core loss, and a plurality of such teeth 2 are arranged and fixed side by side with a predetermined distance in the circumferential direction of a disc, i.e., substantially ring-shaped, stator yoke core 6. Coils are wound up around these teeth 2 through insulating material as bobbins, not shown. Further, as shown in FIG. 17, the teeth 2, the stator yoke core 6 and the coils are integrally fixed by means of molding resin 7 as shown in FIG. 16 such that surfaces 2b of the teeth 2 opposing to the rotor are exposed.

The steel plates 2a of the teeth 2 are assembled to the stator yoke core 6 in a separated state and then molded and fixed together by means of molding resin 7.

However, in such arrangement, it was troublesome to assemble the separated steel plates 2a, which involved cost increasing, thus being disadvantageous.

Because of such reason, in order to reduce troublesome working or loss in assembling, the respective steel plates 2a have been preliminarily fixed by caulking means, for example, such as half pierce member or like. Such structure is for example disclosed in Japanese Patent Laid-open (KO-KAI) Publication HEI 11-318059.

This publication shows salient-pole type core lamination plates corresponding to the steel plates of the teeth mentioned above, the core lamination plates being laminated and fixed by means of a hole formed to the respective plates. Moreover, at the paragraph [0015] of this publication, there is a disclosure such that the holes are formed by punching process, and at the paragraph [0014], the punched-out plates are figured at a portion above the figure of a rolled steel plate in the respective pressing stage in FIG. 2. According to such description, it is apparent that the holes formed to the core lamination plates are through holes.

However, in the case where the respective steel plates 2a are fixed by using the half pierce member, when the fixing is made only at one portion, there is a fear of being separated during its assembling process because of no sufficient strength. For this reason, in order to achieve sufficient calking strength, it becomes necessary to calk the respective steel plates 2a at plural positions.

In addition, although these steel plates 2a are insulated by insulating films, such insulating films may be broken by the formation of the half pierce member, which may result in short-circuiting, and the respective steel plates 2a become electrically connected state. Accordingly, if such half pierce members are located at several portions, a closed circuit will be presented through these half pierce members, and a magnetic flux crosses this closed circuit and then the induction current passes, resulting in the cause of energy loss, thus being inconvenient and disadvantageous.

It has been therefore required to accept either one of conditions of (1) cost-up in assembling for achieving high efficiency (reduction of induction current loss) without forming the half pierce member or (2) efficiency-down for the reduction of cost.

Further, the holes for fixing the respective core lamination plates corresponding to the steel plates of the teeth (tooth) are formed in the above prior art publication, but these holes are through holes, which are not for causing the induction current.

SUMMARY OF THE INVENTION

The present invention was conceived in consideration of the above prior art, and an object of the present invention is to provide a rotary electric machine capable of minimally suppressing the induction current loss even if teeth are fixed through fitting portions and also to provide an electric wheelchair mounted with such rotary electric machine.

These and other objects can be achieved according to the present invention by providing, in one aspect, a rotary electric machine comprising:

a stator including a plurality of teeth which are wound up by coils and a stator yoke core connecting the respective teeth; and a rotor provided with magnets disposed so as to oppose to the teeth, respectively, with a space therebetween, wherein each of the teeth is formed into T shape by laminating a plurality of magnetic steel plates and has a head portion and a leg portion, the head portion being a wider portion of the T-shape which is opposed to the magnet, the leg portion including a coil wind-up portion around which a coil is wound up and which has a substantially constant width and an insert portion which is inserted into the stator yoke core, and the coil wind-up portion is formed with a plurality of fitting portions for fitting and fixing the laminated magnetic steel plates together, the fitting portions being arranged so as to align along a center line of the coil wind-up portion.

In a preferred embodiment of this aspect, it may be desired that the fitting portion is formed in an area apart from the head portion and the insert portion by not less than a ½ length of a width of the coil wind-up portion.

The teeth and the magnets may be arranged so as to oppose to each other with a space in a rotation axis direction.

It is desirable that the magnetic steel plates have both side surfaces on which insulating film is formed other than the fitting portion so that a closed circuit is formed between the magnetic steel plates through the fitting portions. The insulating film formed on the side surfaces of the magnetic steel plates is broken at the fitting portion when the fitting portions are formed and fitted to the steel plates.

The fitting portions may be formed to the respective steel plates so as to have protruded portions and recessed portions such that the protruded portion of the fitting portion of one magnetic steel plate is fitted and fixed to the recessed portion of the fitting portion of an adjacent magnetic steel plate when the magnetic steel plates are laminated together.

It may be desired that the fitting portions are formed in parallel with or on the center line of the coil wind-up portion.

It is desirable that the fitting portions are each formed as a half pierce portion having a half protruded portion and half recessed portion or each formed as a V-shaped calking portion.

According to the rotary electric machine of the present invention of the characteristics mentioned above, a plurality of fitting portions formed to the coil wind-up portions, each having substantially the constant width, of the teeth are arranged along the center line of this wind-up portion. Therefore, at the time of high flux density in the coil wind-up portion, the magnetic flux flows in the same direction as that of the center line thereof, and by arranging the plural fitting portions in alignment with the same direction as that of the center line, the variation in the magnetic flux flowing the closed circuit formed between the fitting portions can be significantly suppressed, and hence, the loss of energy can be also reduced. In addition, the formation of the plural fitting portions can contribute to the assembling performance of the rotary electric machine with improved strength against conveyance, transportation or like.

Moreover, according to the other features of the present invention, since the fitting portions are formed at portions apart from the head portion or insert portion of the tooth by not less than ½ width of the wind-up portion thereof, the disturbance of the magnetic flux at the portions near the head portion, the stator yoke core or yoke insert portion can be significantly suppressed and the loss of energy can be also suppressed.

The rotary electric machine formed according to the present invention has a compact, flat and lightweight structure with the small loss of energy can be provided.

Furthermore, each of the fitting portions formed to the magnetic steel plates has protruded and recessed portions, and the protruded portion of one steel plate is fitted to the recessed portion of the other adjacent steel plate to thereby easily laminate and fix the respective steel plates together.

In another aspect of the present invention, there is also provided an electric wheelchair comprising:

a frame structure constituting a vehicle body frame;
a seat disposed on the frame structure;
a pair of driving wheel units including two wheels;
an electric motor mounted to each of the paired driving wheel units; and
an operation member operatively connected to the electric motor for operating the driving wheel units, wherein the electric motor comprises a rotary electric machine, which comprises a stator including a plurality of teeth which are wound up by coils and a stator yoke core connecting the respective teeth and a rotor provided with magnets disposed so as to oppose to the teeth, respectively, with a space therebetween, in which each of the teeth is formed into T shape by laminating a plurality of magnetic steel plates and has a head portion and a leg portion, the head portion being a wider portion of the T-shape which is opposed to the magnet, the leg portion including a coil wind-up portion around which a coil is wound up and which has a substantially constant width and an insert portion which is inserted into the stator yoke core, and the coil wind-up portion is formed with a plurality of fitting portions for fitting and fixing the laminated magnetic steel plates together, the fitting portions being arranged so as to align along a center line of the coil wind-up portion.

According to this aspect, the electric wheelchair mounted with the improved rotary electric machine having compact structure and high output performance can be provided.

The nature and further characteristic features of the present invention will be made more clear from the following descriptions made with reference to the accompanying drawings.

DESCRIPTION OF THE PREFERRED EMBODIMENT

Preferred embodiments of the present invention will be described hereunder with reference to the accompanying drawings.

First Embodiment

The first embodiment of the present invention is represented by FIGS. 1 to 12.

Figure 1:
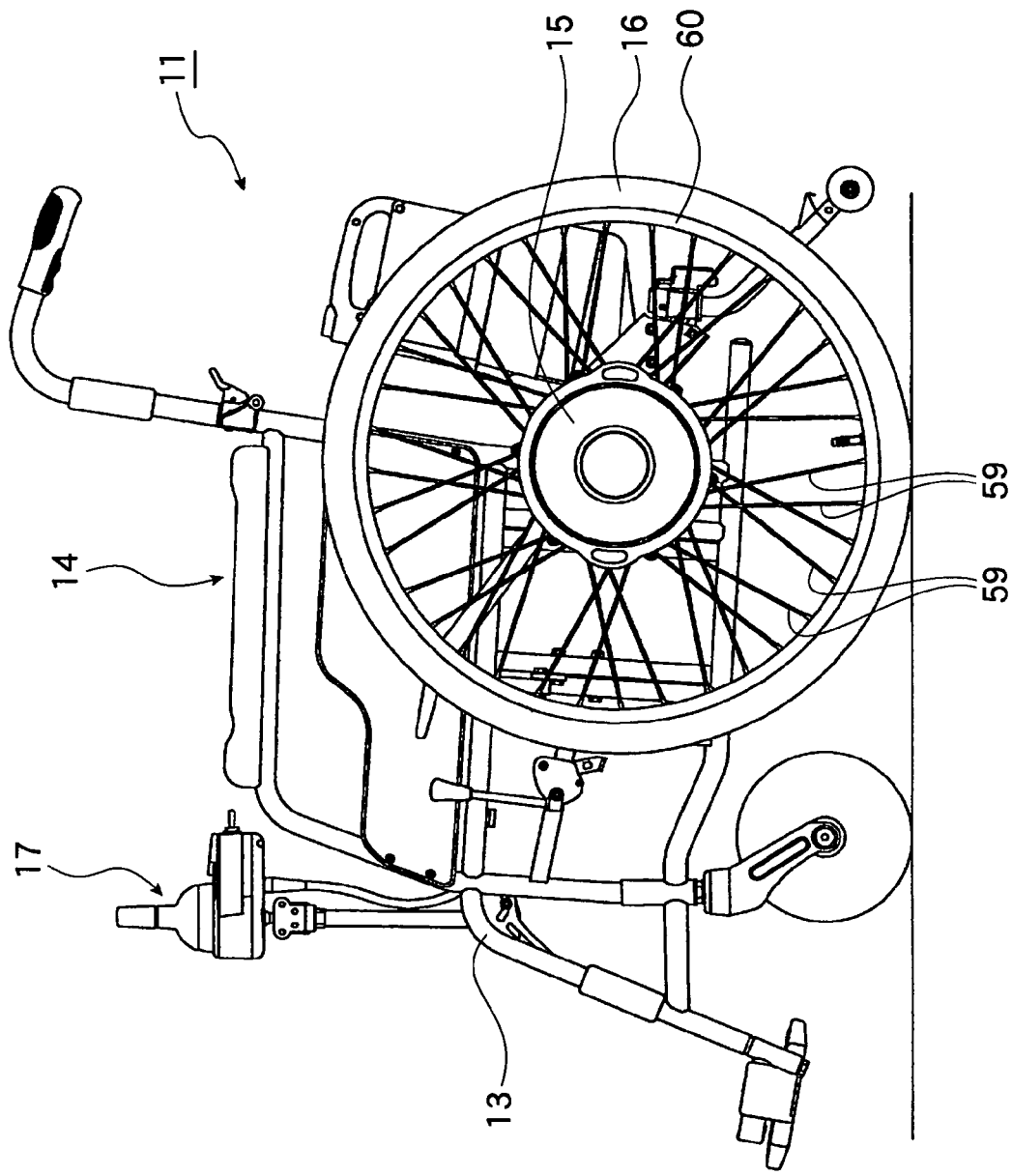
FIG. 1 is a side view of an electric wheelchair mounted with an electric motor according to a first embodiment of the present invention.

With reference to FIG. 1, reference numeral 11 denotes an electric wheelchair or electrically powered wheelchair mounted with an electric motor 12 as a "rotary electric machine" according to the present invention, and the electric wheelchair is driven and traveled by the driving force of the electric motor 12.

The electric wheelchair 11 is provided with a frame 13 as a framework of a vehicle (electric wheelchair body), a seat 14 on which a user sits and a pair of driving wheel units 15 in which the electric motors 12 are mounted. When an operation unit 17 of the electric wheelchair 11 is operated, the paired driving wheel units 15 are driven so as to drive driven wheels 16 by predetermined amount (distance). The driven wheels 16 are operated independently, and by the operation of the operation unit 17, the driven wheels 16 are changed in their rotating directions and driven speed, respectively.

Figure 2:
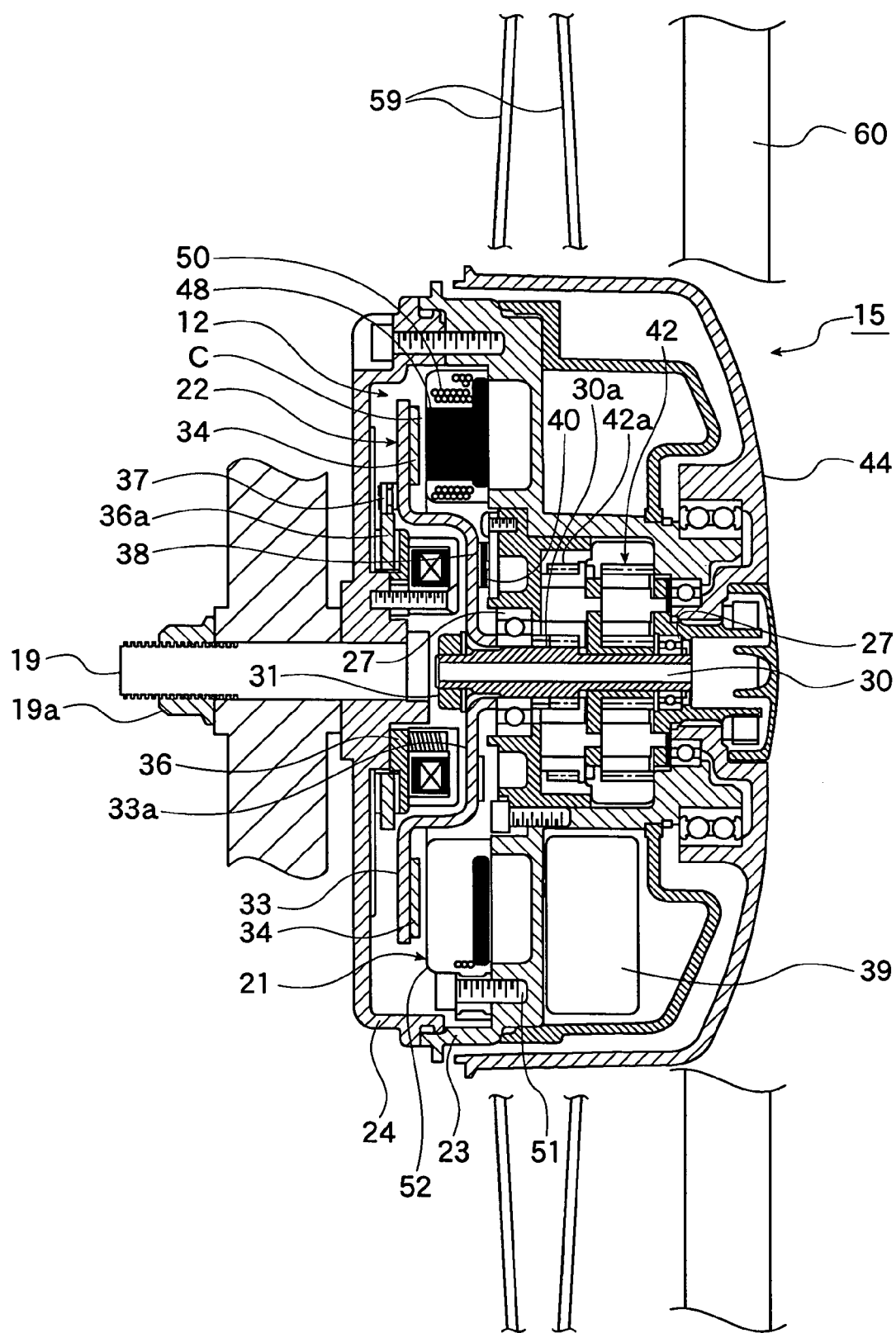
FIG. 2 is a sectional view of the electric motor for the electric wheelchair of the first embodiment.

The driving wheel unit 15 is composed, as unit, of the electric motor 12, the driving unit, the driven wheels 16 and so on, and as shown in FIG. 2, the driving wheel unit 15 is fixed to the frame 13 by means of bolt 19 and nut 19a.

The electric motor 12 is of an axial gap type composed of a stator 21 and a rotor 22, which are accommodated in a space defined by a case 23 and a cover 24. The bolt 19 is planted to the cover 24.

The stator 21 is fastened to the case 23 by means of bolt 51, and on the other hand, the rotor 22 is fitted to a rotor shaft 30, through serration fitting, provided for the case 23 to be rotatable through bearings 27, 27 and fixed thereto.

Figure 3:
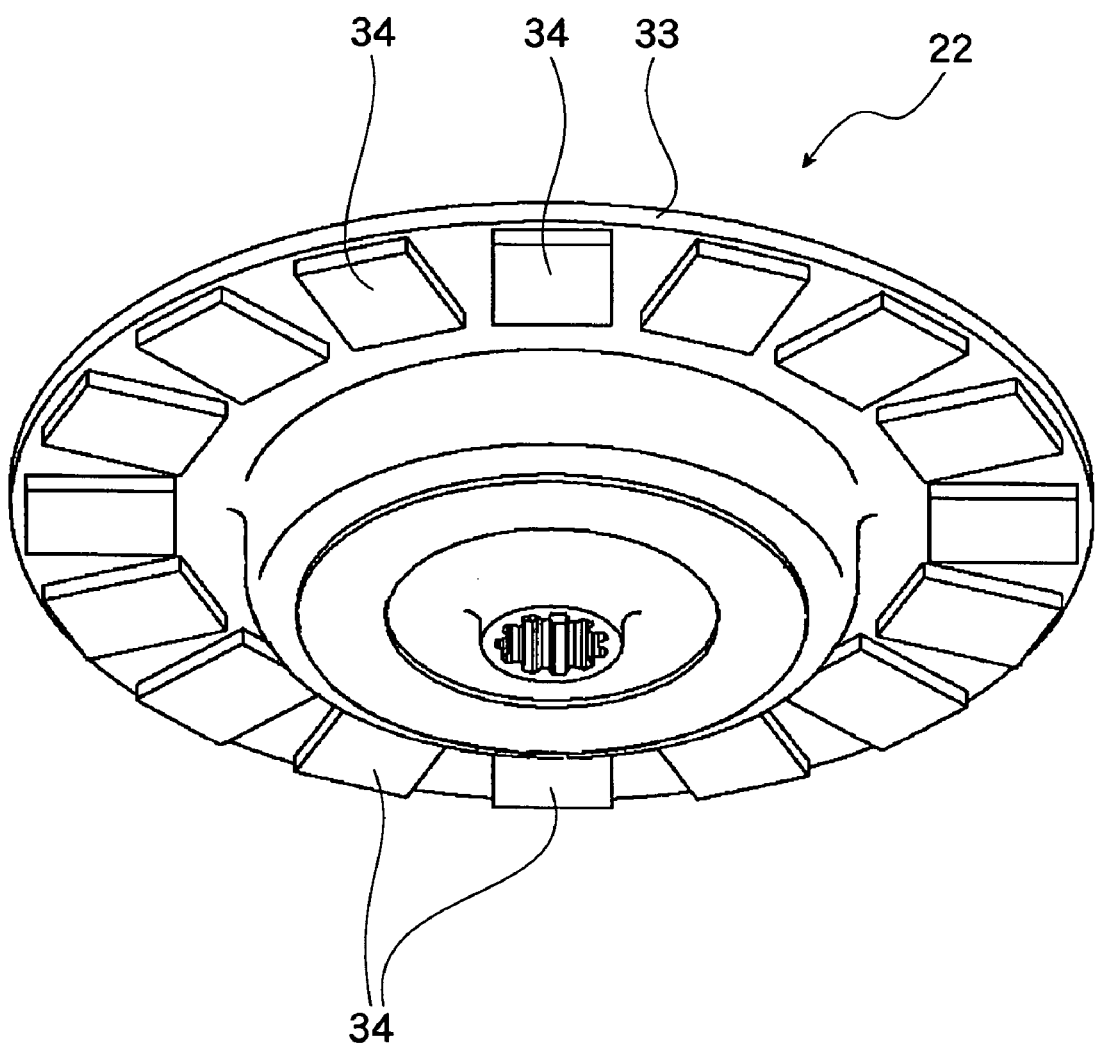
FIG. 3 is a perspective view of a rotor of the electric motor of FIG. 2.
Figure 4:
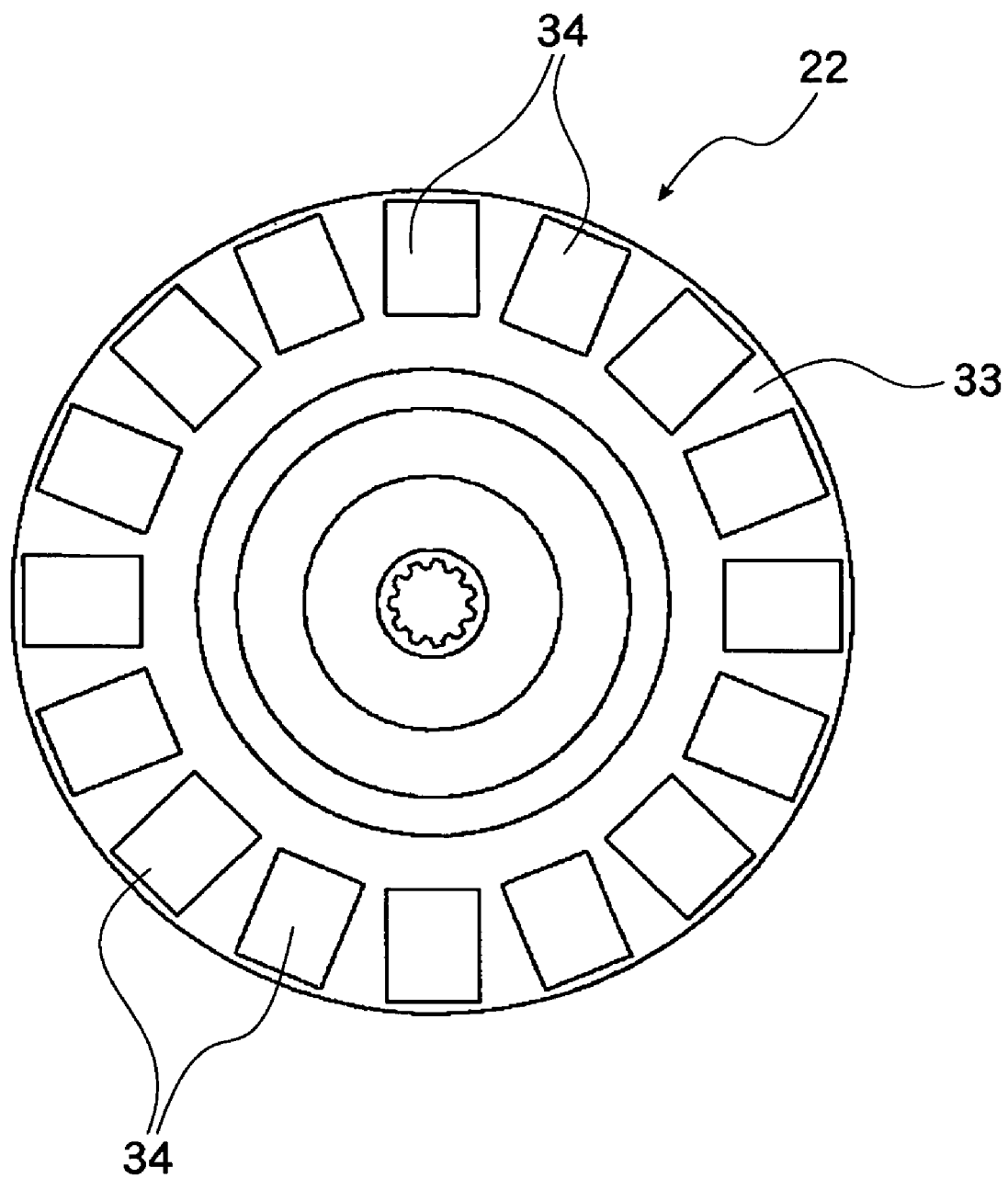
FIG. 4 is a front view of the rotor of the electric motor of FIG. 2.

The rotor 22 has, as shown in FIGS. 3 and 4, a disc shaped rotor yoke 33, which has a central portion fitted to the rotor shaft 30 through the serration fitting. A plurality of magnets 34, each having a rectangular shape, are arranged and bonded to be fixed to the peripheral edge portion of the rotor yoke 33 at a predetermined constant interval in the circumferential direction thereof. These magnets 34 are disposed so as to oppose to the stator 21 with a gap C (FIG. 2) in the rotation axis direction.

These magnets 34 are arranged so that N and S poles are adjacently alternated and bonded and fixed to the rotor yoke 33 in the shape of circle.

The rotor yoke 33 is press worked as shown in FIGS. 2 and 3 so as to provide a central recessed portion 33a, and in this recessed portion 33a, an electromagnetic brake 36 fixed to the cover 24 is accommodated. An annular rotary body 36a and the rotor 22, of which rotations are stopped by the electromagnetic brake 36, are made stationary in the rotating direction through a pin 37. Moreover, on the other hand, a sensor magnet 38 is bonded and fixed to the opposite side of the recessed portion 33a, and a pole position sensor (hole IC) 40 opposing to the sensor magnet 38 is fixed to the case 23. The pole position sensor 40 is electrically connected to a controller 39, and the pole position of the rotor 22 is detected by the pole position sensor 40.

Further, a sun-gear 30a is mounted to the rotor shaft 30 so as to be meshed with a two-staged planetary gear 42a of a planetary reduction gear 42. The planetary reduction gear 42 reduces the rotation of the rotor 22, which is then transmitted to a hub 44, and the rotation of the hub 44 rotates the driving wheel 16.

On the other hand, the stator 21 is provided with a substantially disc (ring) shaped stator yoke core 47, a plurality of teeth 48 arranged in the circumferential direction of the stator yoke core 47 with a predetermined interval and a coil 50 wound up around each of the teeth (i.e., tooth) 48 through bobbins 49. These stator yoke core 47, the teeth 48 and the coils 50 are integrally molded and fixed together. At this time, a plurality of collars 53 are inserted around the stator 21 to thereby simultaneously form mount flanges 52a.

These mount flanges 52a are fixed to the case 23 by means of bolts 51.

The coil 50 is coupled with each of U, V and W-phases, and one end of each coupling coil is electrically connected (neutral point) and the other end thereof is derived out of the mold so as to be connected to a driver.

Figure 8:
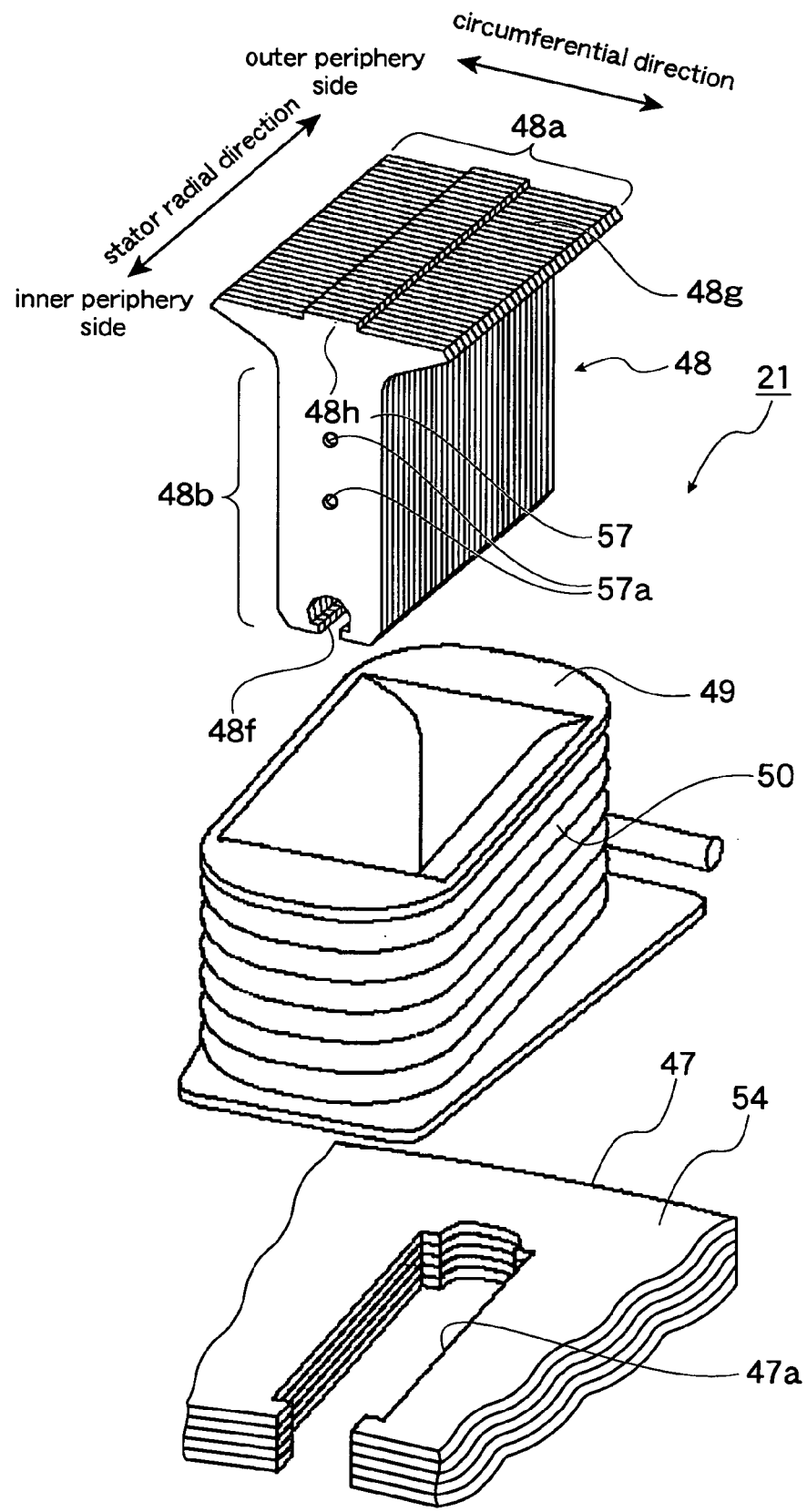
FIG. 8 is a developed perspective view showing a portion of the stator of the electric motor of the electric wheelchair of the first embodiment.

More in detail, the stator yoke core 47 is formed from a plurality of steel plates 54, having the same shape, which are laminated as shown in FIG. 8, and formed with fitting holes 47a into which teeth 48 are inserted.

The tooth 48 is formed by laminating a plurality of magnetic steel plates 57 so as to provide a T-shape, and is composed of a wider head portion 48a, which is opposed to the magnet 34 of the T-shaped tooth 48, and a leg portion 48b thereof. The leg portion 48b includes a coil wind-up portion 48c having a constant width around which the coil 50 is wound up and an insert portion 48d to be inserted into the fitting hole 47a of the stator yoke core 47.

The wind-up portion 48c is formed with a plurality of half pierce portions 57a (two portions in the illustration) as fitting portions for fixing a plurality of laminated magnetic steel plates 57. Further, the half pierce portion 57a is in the form of half blind hole shape (having concave-convex portion), so that this portion is called as "half pierce portion" 57a herein. The half pierce portions 57a are arranged in the direction parallel with the center line O1 of the wind-up portion 48c, and in the illustration, they are arranged on the center line O1 which is substantially parallel to the longitudinal direction of T-shaped tooth (or vertical direction in FIG. 9).

Figure 11:
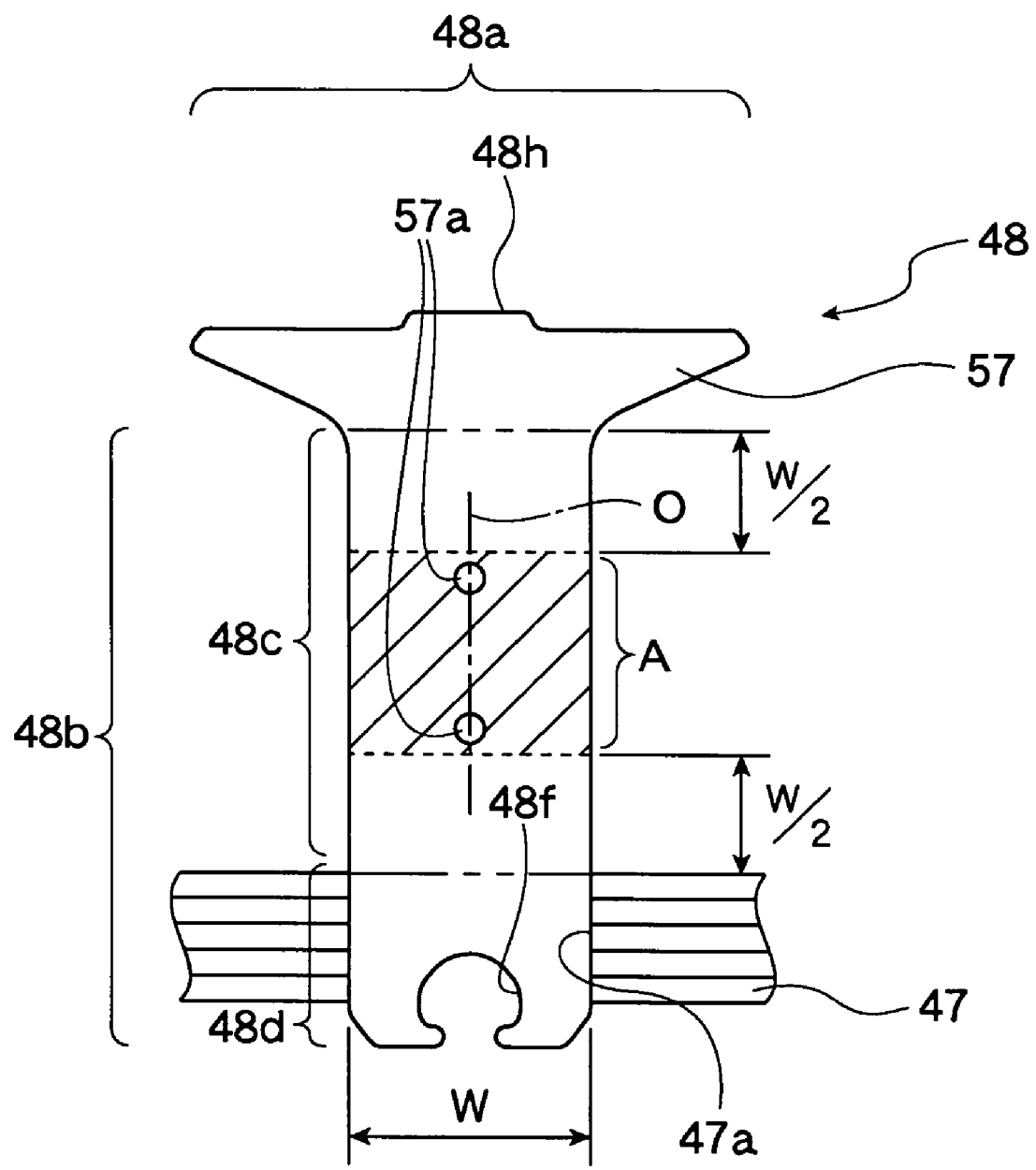
FIG. 11 is an illustration of an arrangement of a stator yoke core and the teeth according to the first embodiment.

These two half pierce portions 57a is positioned in an area A apart from the head portion 48a and the insert portion 48d by ½ distance of the width W of the wind-up portion 48c as shown in the hatched portion of FIG. 11.

Figure 10:
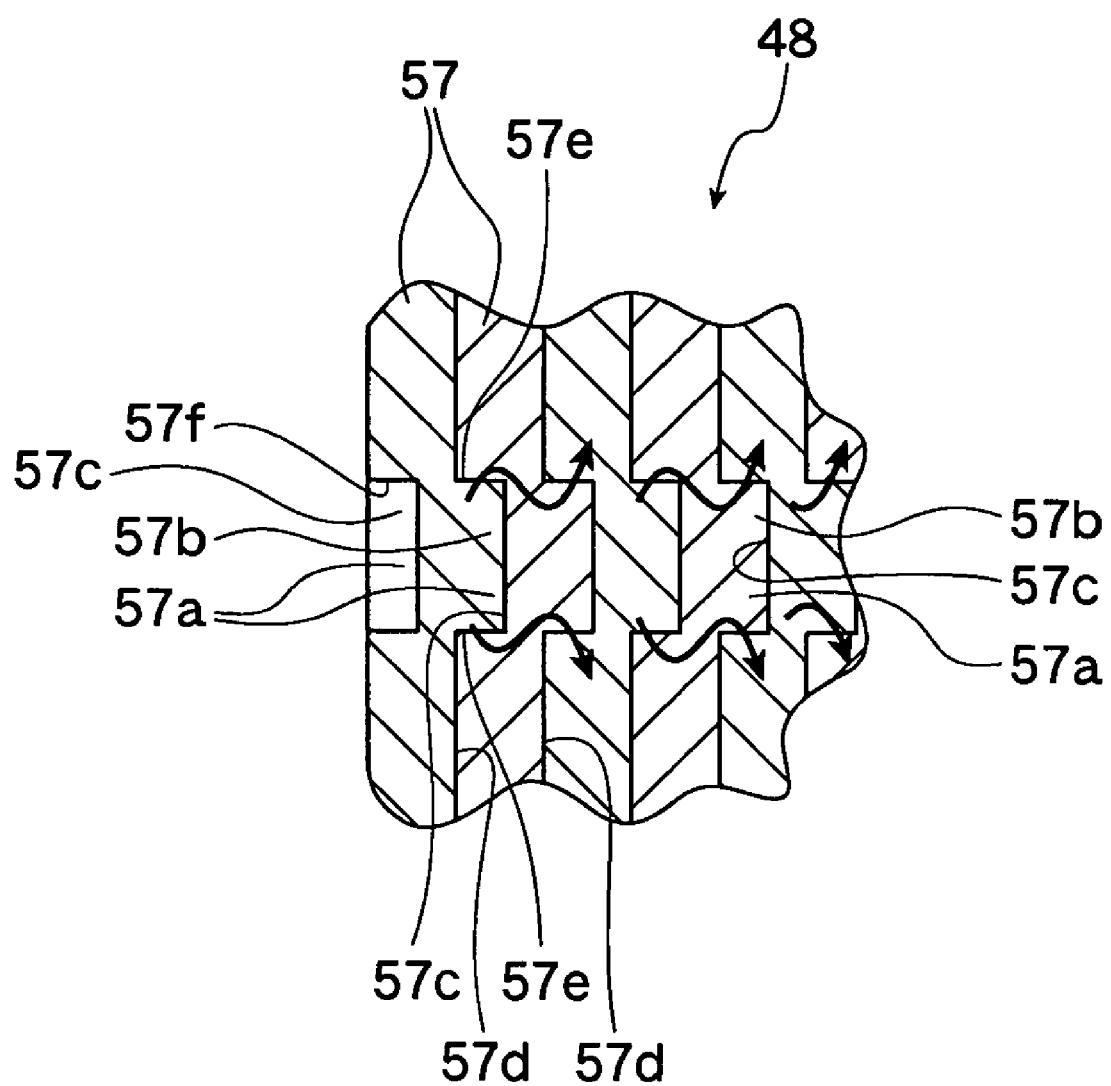
FIG. 10 is a sectional view taken along the line X-X in FIG. 9.

As also shown in FIG. 10, each of the half pierce portions 57a of one magnetic steel plate 57 has a substantially rectangular, in section, protruded portion 57b which is fitted into a recessed portion 57c of the half pierce portion 57a of the adjacent one magnetic steel plate 57. The magnetic steel plate 57 is coated, at its both side surfaces, with an insulating film 57d entirely to be insulated. However, the side surface portion 57e of the fitting protruded portion 57b and the side surface portion 57f of the fitted recessed portion 57c are not coated with the insulating film because of the formation of the half pierced portion 57a, so that the adjacent magnetic steel plates 57 are electrically short-circuited as shown with arrows in FIG. 10, thus constituting a closed circuit.

Figure 5:
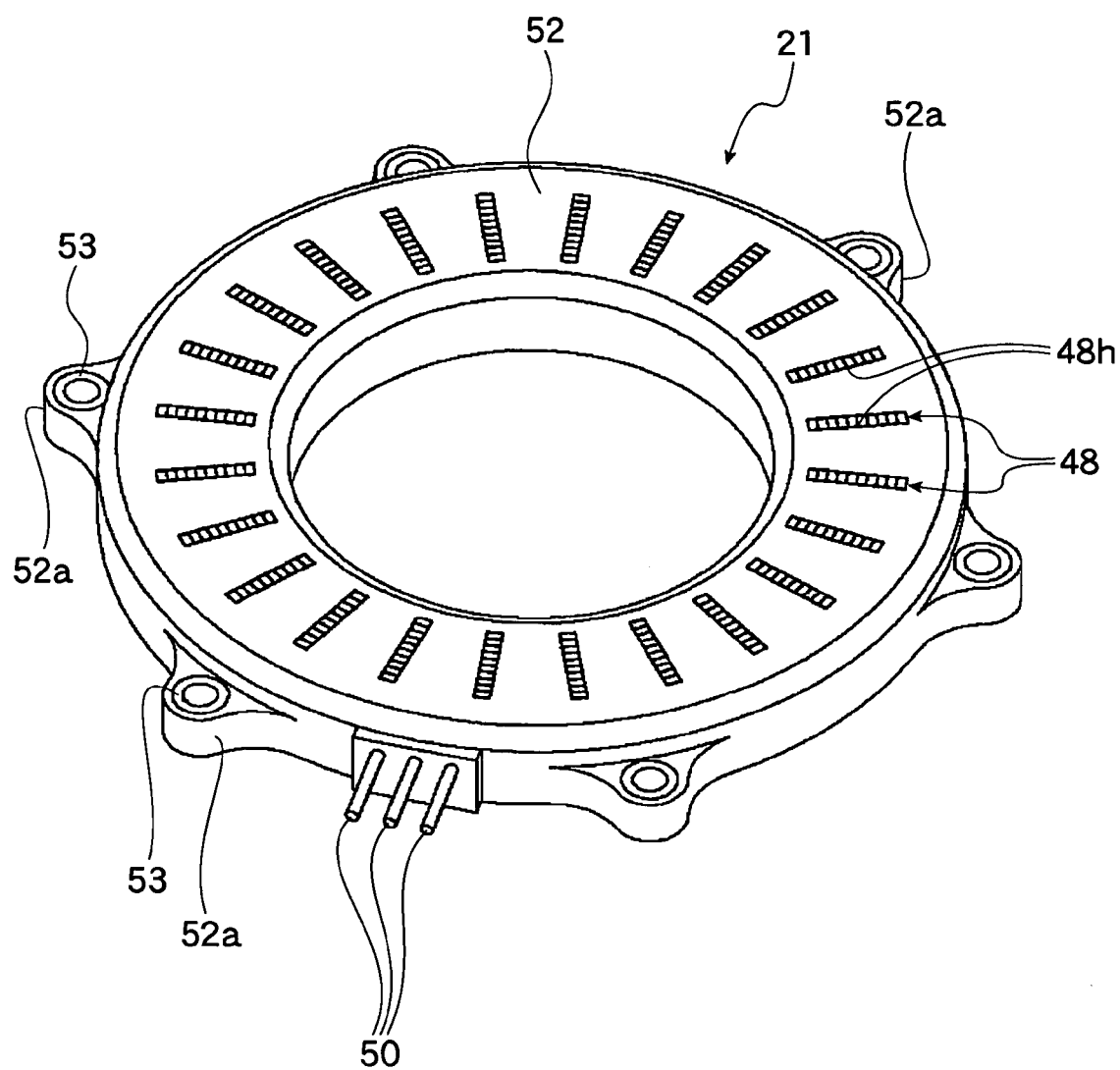
FIG. 5 is a perspective view of a stator of the electric motor of the electric wheelchair of the first embodiment.
Figure 6:
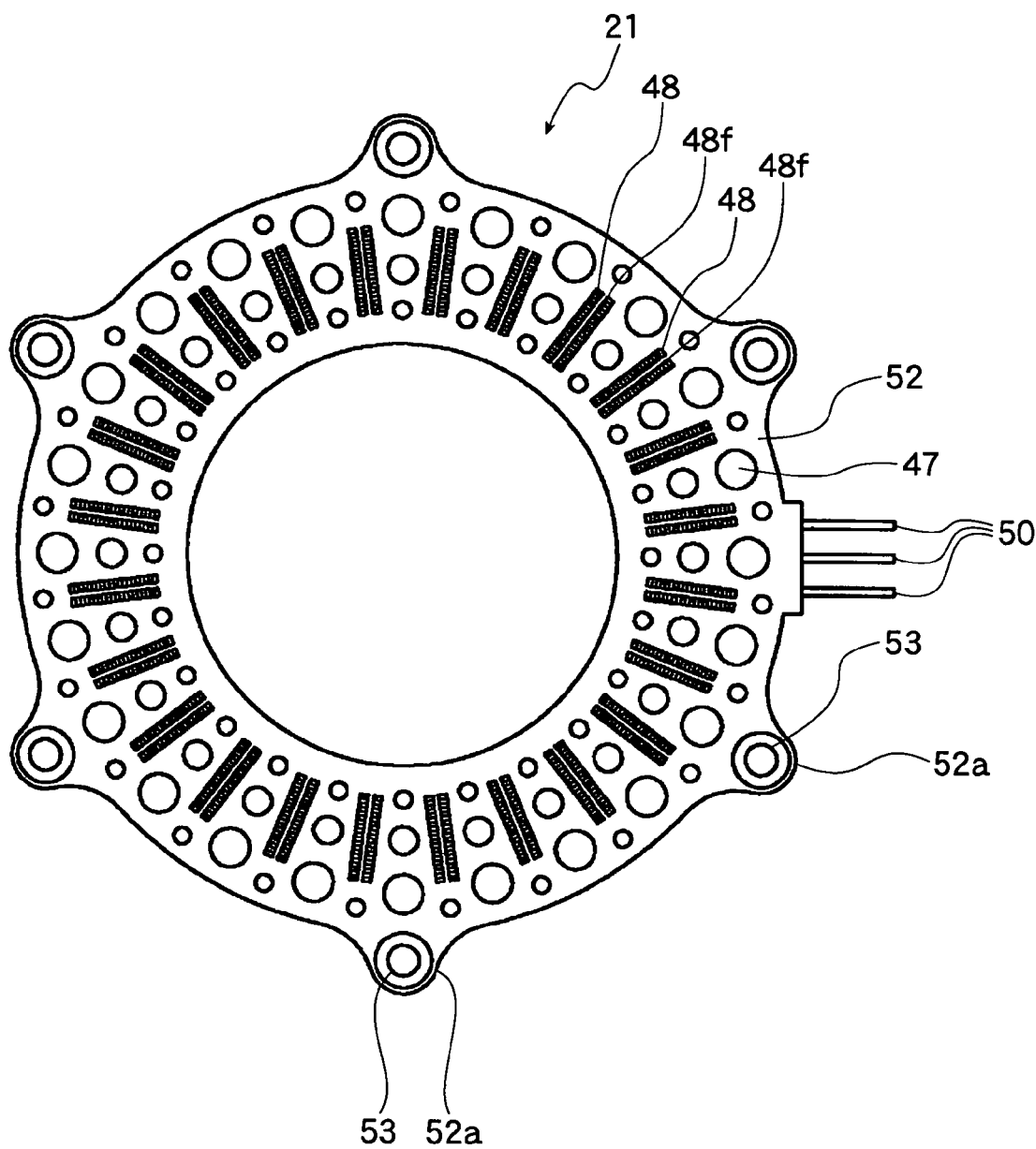
FIG. 6 is a back-side view of the stator of FIG. 5.
Figure 7:
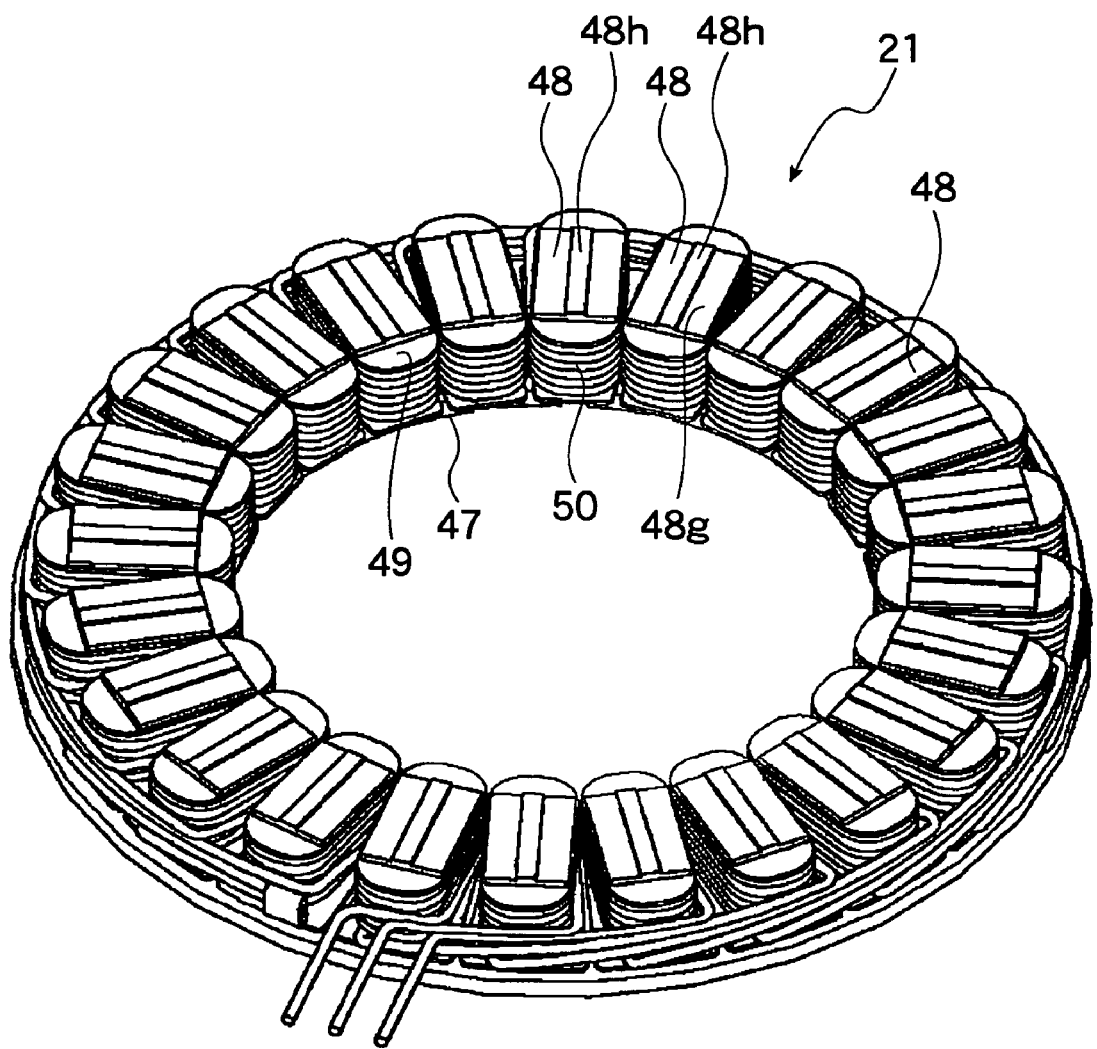
FIG. 7 is a perspective view of the stator, before molding, of the electric motor according to the first embodiment.

Furthermore, the insert portion 48d of the tooth 48 is formed with a resin filling groove 48f in which a molding resin 52 is filled up so as to prevent the tooth 48 from coming off. The head portion 48a thereof is also formed with an opposing surface 48g opposing to the magnet 34 of the rotor 22, and a protruded portion 48h is formed to the opposing surface 48g at substantially a central portion in the stator circumferential direction so as to extend radially. The protruded portion 48h has the same height and width in the entire length direction thereof. The opposing side surfaces 48g except the protruded portion 48h are embedded with the molding resin 52 as shown in FIG. 5.

The opposing surface 48g of the tooth 48 and the magnet 34 of the rotor 22 are arranged so as to oppose to each other through a gap C in the rotation axis direction.

Further, in FIG. 2, reference numeral 59 denotes a spork of the wheel and 60 denotes a hand rim.

The first embodiment will be operated in the manner mentioned hereunder.

When current passes the coil 50 to be energized so as to drive the electric motor 12, the magnetic force of the coil 50 and that of the magnet 34 are combined to thereby generate magnetic force between the stator 21 and the rotor 22, thus rotating the rotor 22 and then driving the driven wheel 16 through the rotor shaft 30, the hub 44 and so on.

Figure 12A:
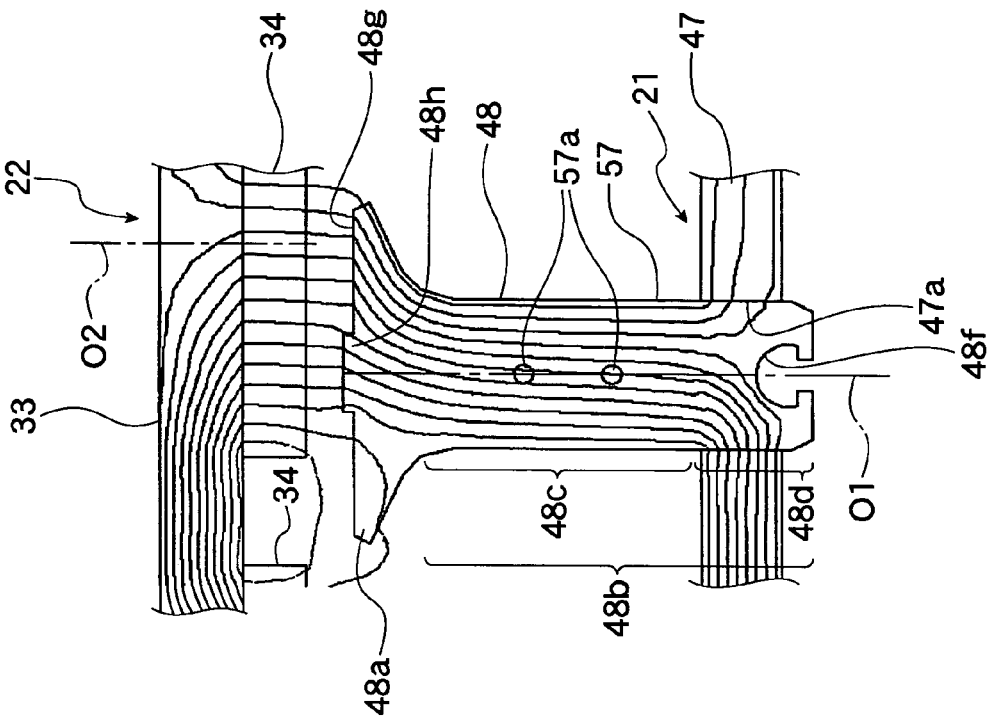
FIGS. 12A and 12B are views showing magnetic fluxes concerning the electric motor according to the first embodiment, which are different in the position of the rotor.
Figure 12B:
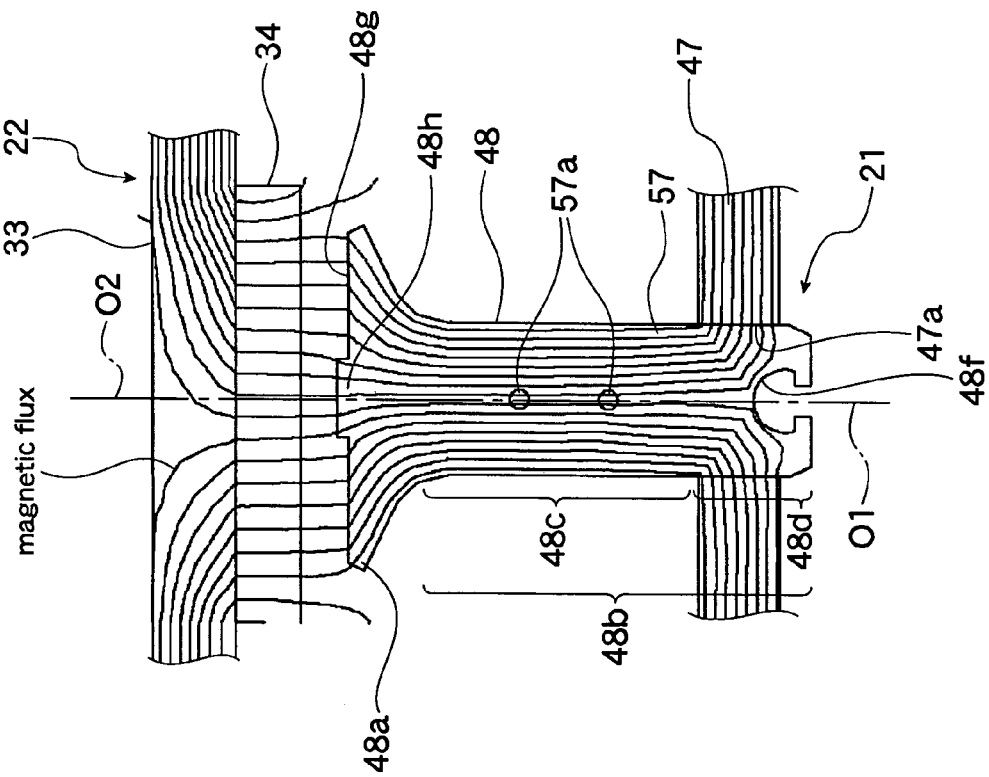

At this time, as shown in FIGS. 12A and 12B, the magnetic flux flows through the rotor yoke 33, the magnet 34, the teeth 48 and the stator yoke core 47, and the magnetic flux flows in parallel with the center line O1 (see FIG. 11) at the wind-up portion 48c of the tooth leg portion, but the flux flow directions in other portions such as head portion 48a and the insert portion 48d are not constant. Accordingly, by forming the plural half pierce portions 57a along the center line O1 to the wind-up portion 48c at which the magnetic flux flows in parallel with the center line O1, the closed circuit constituted by the structure of the half pierce portions 57a is also formed along the center line O1, whereby the change in the magnetic flux flowing across the closed circuit can be reduced, and as a result, the induction current passing the closed circuit is also reduced to thereby suppress the energy loss.

Figure 9:
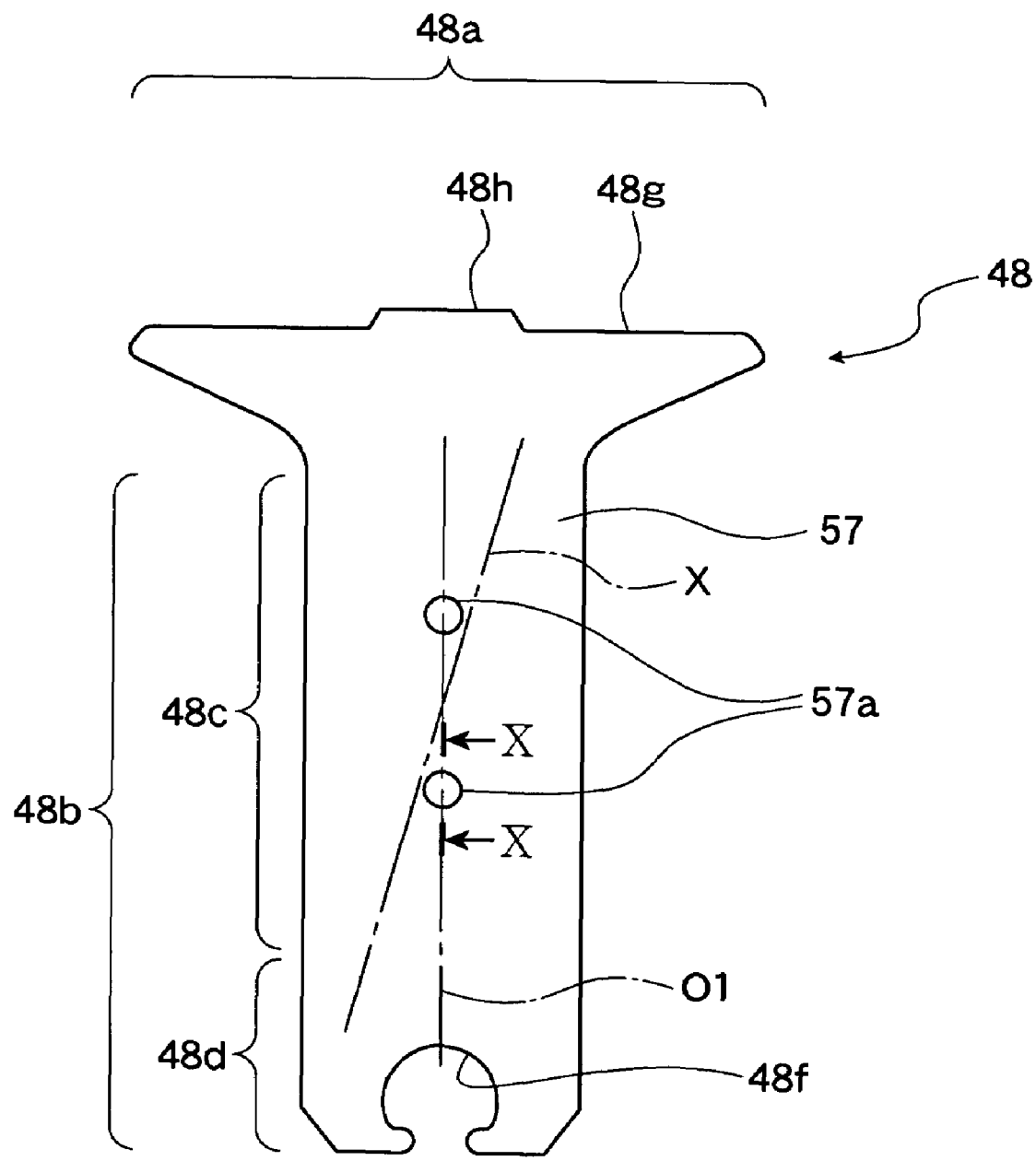
FIG. 9 is a front view of the tooth of the stator of the electric motor.

On the contrary, in a case where a pair of half pierce portions 57a are arranged in a direction inclined with respect to the center line O1 as shown with two-dot-chain line X in FIG. 9, for example, the closed circuit formed by the short-circuited half pierce portions 57a and the magnetic flux flowing in parallel with the center line O1 interlinks each other. Then, according to the change in the magnetic flux, an induction voltage obtained by differentiating an interlinking flux is generated in this closed circuit, which then causes an induction current.

FIG. 12A shows the magnetic flux flow in an arrangement in which the center line O1 of the wind-up portion 48c and a center line O2 of the magnet 34 are coincident with each other, and FIG. 12B shows the magnetic flux flow in an arrangement in which the center lines O1 and O2 are not coincident and slightly shifted from each other. As shown in FIG. 12B, although the flow of the magnetic flux is disturbed at the portion near the head portion 48a and the insert portion 48d, by providing the two half pierce portions 57a in the hatched area A apart from the head portion 48a and the insert portion 48d by the distance of not less than ½ width of the wind-up portion 48c as shown in FIG. 11, the magnetic flux flows along the center line O1 in this area A, so that the generation of the induction current can be further suppressed, thus reducing the energy loss.

Further, since the tooth 48 shown in FIG. 8 is formed by laminating a plurality of magnetic steel plates 57 of the same kind, working cost and molding cost can be suppressed minimally, and in addition, these magnetic steel plates 57 are caulked and fixed by the half pierce portions 57a, so that these steel plates can be easily laminated and assembled as the tooth.

Furthermore, the teeth 48 are formed with the resin filling grooves 48f each having a wide inner space in which the molding resin 52 is filled up, so that the teeth 48 can be firmly fixed to the stator yoke core 47 to thereby preventing then from coming off.

Still furthermore, the coming-off prevention structure against the attractive force of the magnet 34 can be also formed by covering, with the molding resin 52, portions other than the protruded portion 48h of the opposing surface 48g of the tooth 48.

Further, according to the electric motor 12 of the embodiment of the present invention, the energy loss can be sup-pressed minimally, so that an electric wheelchair 11 provided with such electric motor 12 can be also preferably provided.

Second Embodiment

Figure 13:
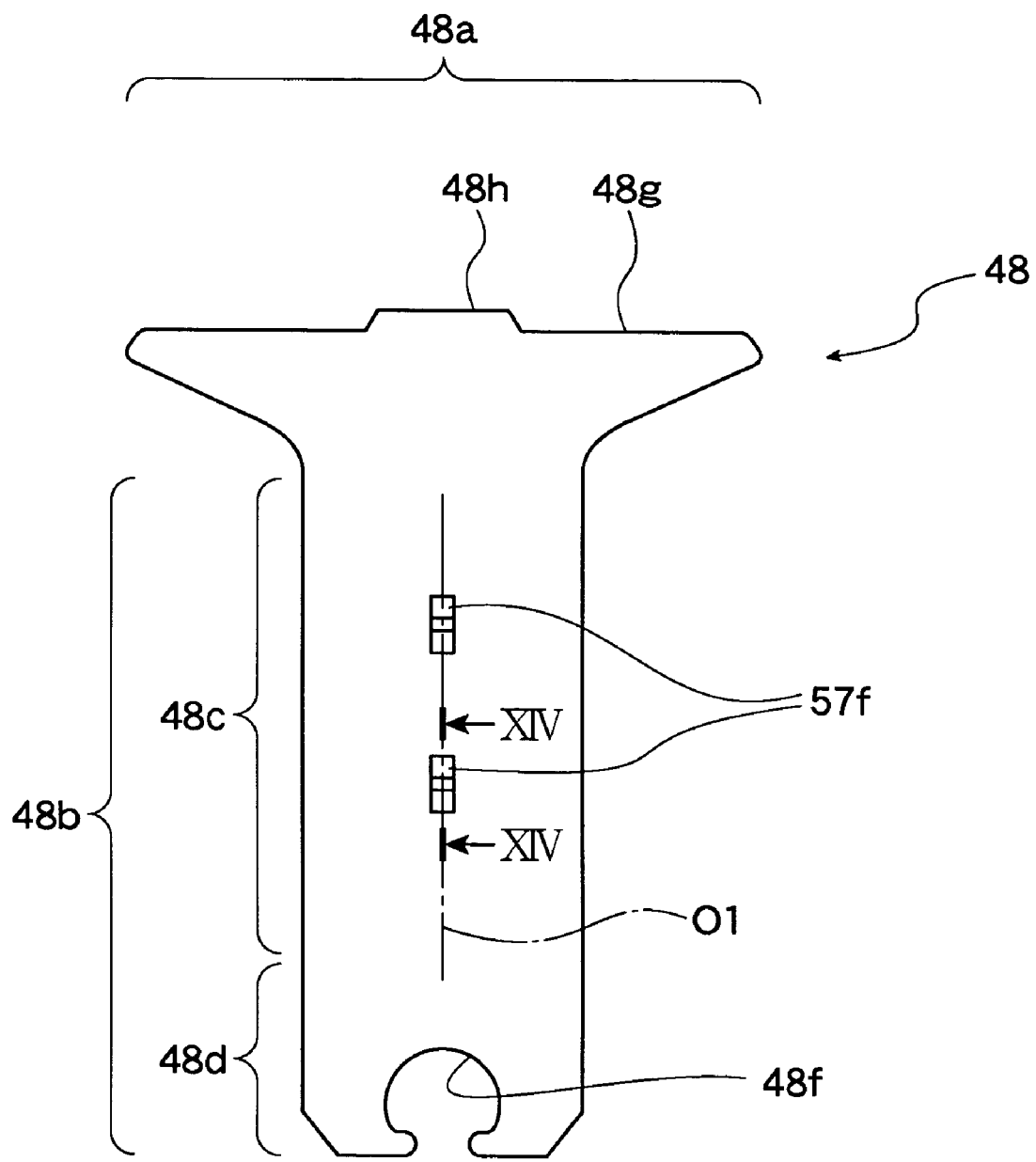
FIG. 13 is a front view of the tooth of the electric motor according to a second embodiment of the present invention.
Figure 14:
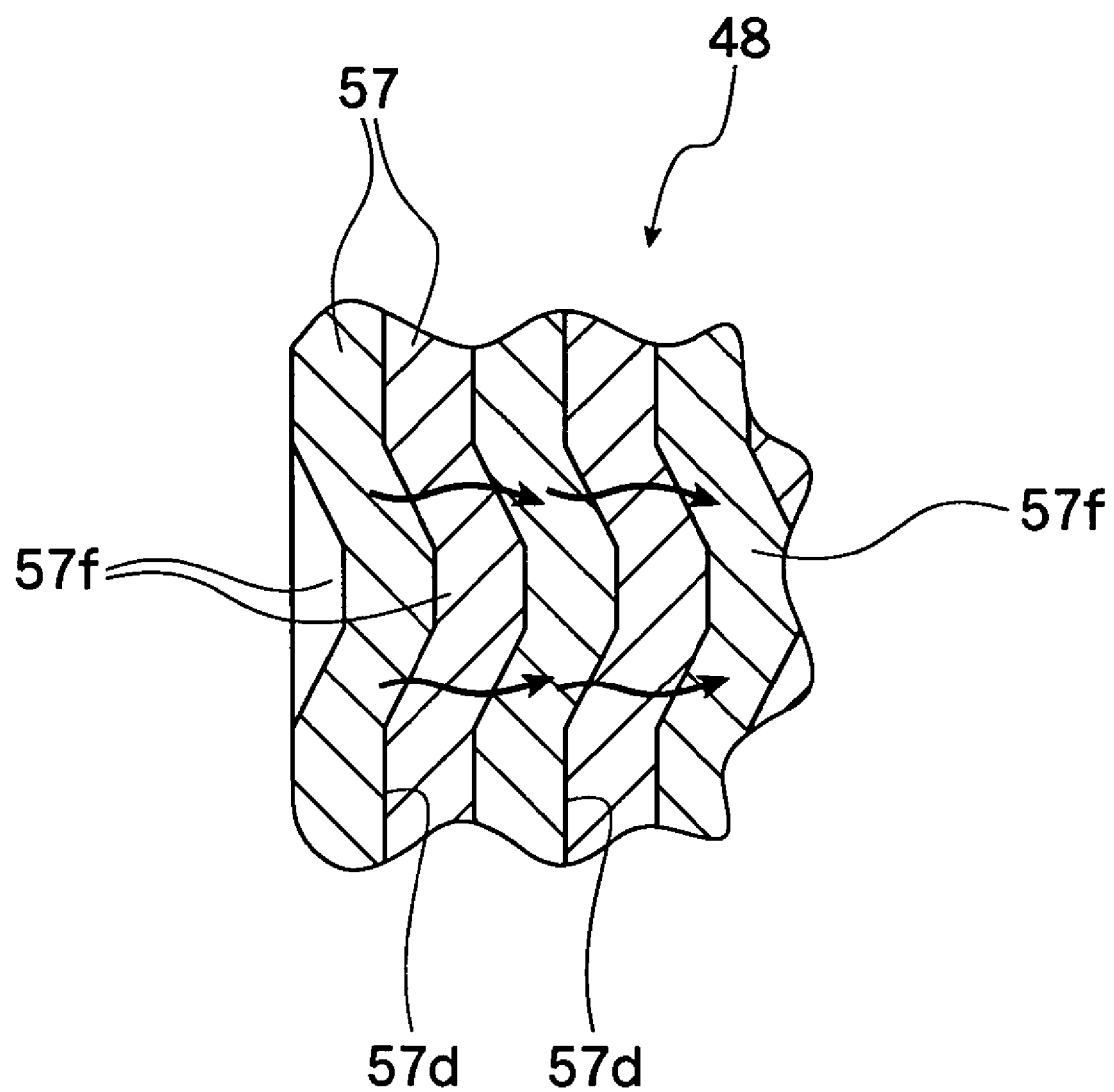
FIG. 14 is a sectional view taken along the line XIV-XIV of FIG. 13.

FIGS. 13 and 14 represent the second embodiment of the present invention.

In this second embodiment, the structure of the fitting portion differs from that of the first embodiment.

That is, in the first embodiment, the half pierce portion 57a has substantially the circular shape as a front view, but in this second embodiment, this portion has a rectangular shape in the direction along the center line O1 of the wind-up portion 48c as shown in FIG. 13, and the respective magnetic plates 57 are caulked and fixed together by V-shaped caulking portions 57f each showing V-shape as shown in FIG. 14 in cross-section. These two caulking portions 57f are arranged along or on the center line O1 of the wind-up portion 48c as like as the half pierce portions 57a of the first embodiment.

The structures other than the above are substantially the same as those in the first embodiment, so that explanation thereof is omitted herein.

It is to be noted that the present invention is not limited to the described embodiment and many other changes and modifications may be made without departing from the scopes of the appended claims.

For example, in the first and second embodiment of the present invention mentioned above, the "fixing portion" such as half pierce portions in the first embodiment or V-shaped caulking portions in the second embodiment are formed simultaneously in the pressing process of the steel plates 57, and in the subsequent process, when the plural steel plates are laminated and pressed, the "fitting portions" are fitted and fixed together. However, the present invention is not limited to the described lamination method.

The structure of the fitting portions is also not limited to the described embodiment and many other changes may be made as far as the steel plates can be laminated and fixed together.

Still furthermore, although in the described embodiments, two half pierce portions or calking portions are formed, three or more ones may be formed or a plurality of rows of them may be also formed along the center line.

Figure 15:
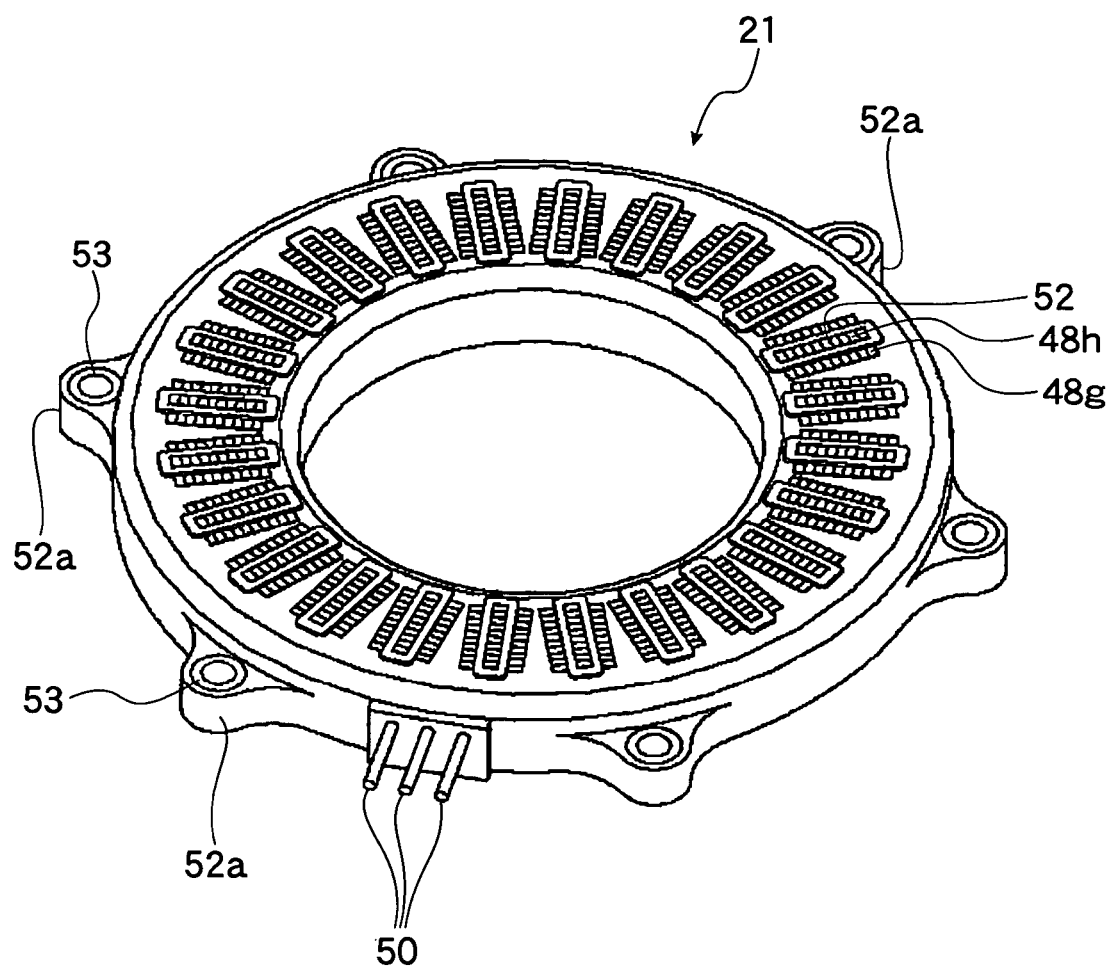
FIG. 15 is a modification of the second embodiment and shows a perspective view of the stator of the electric motor corresponding to FIG. 5.
Figure 16:
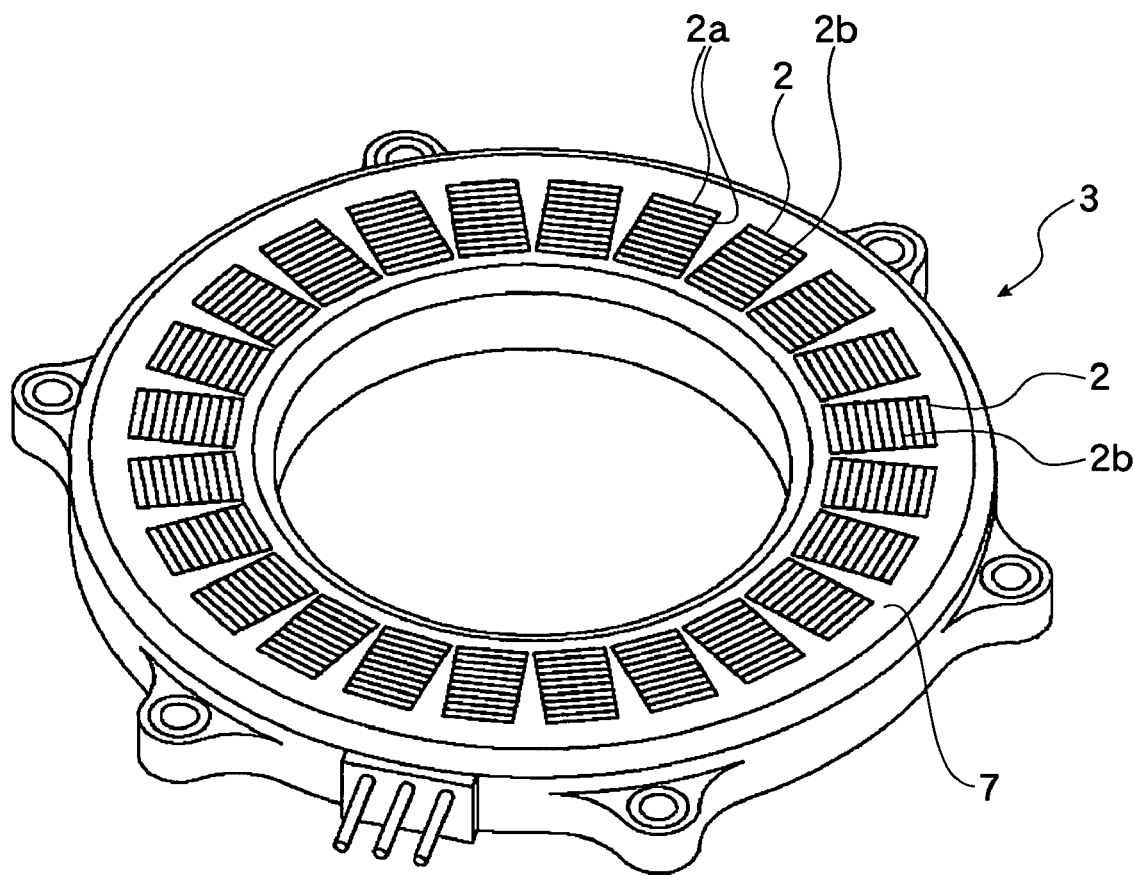
FIG. 16 is a perspective view of a stator of a conventional structure.
Figure 17:
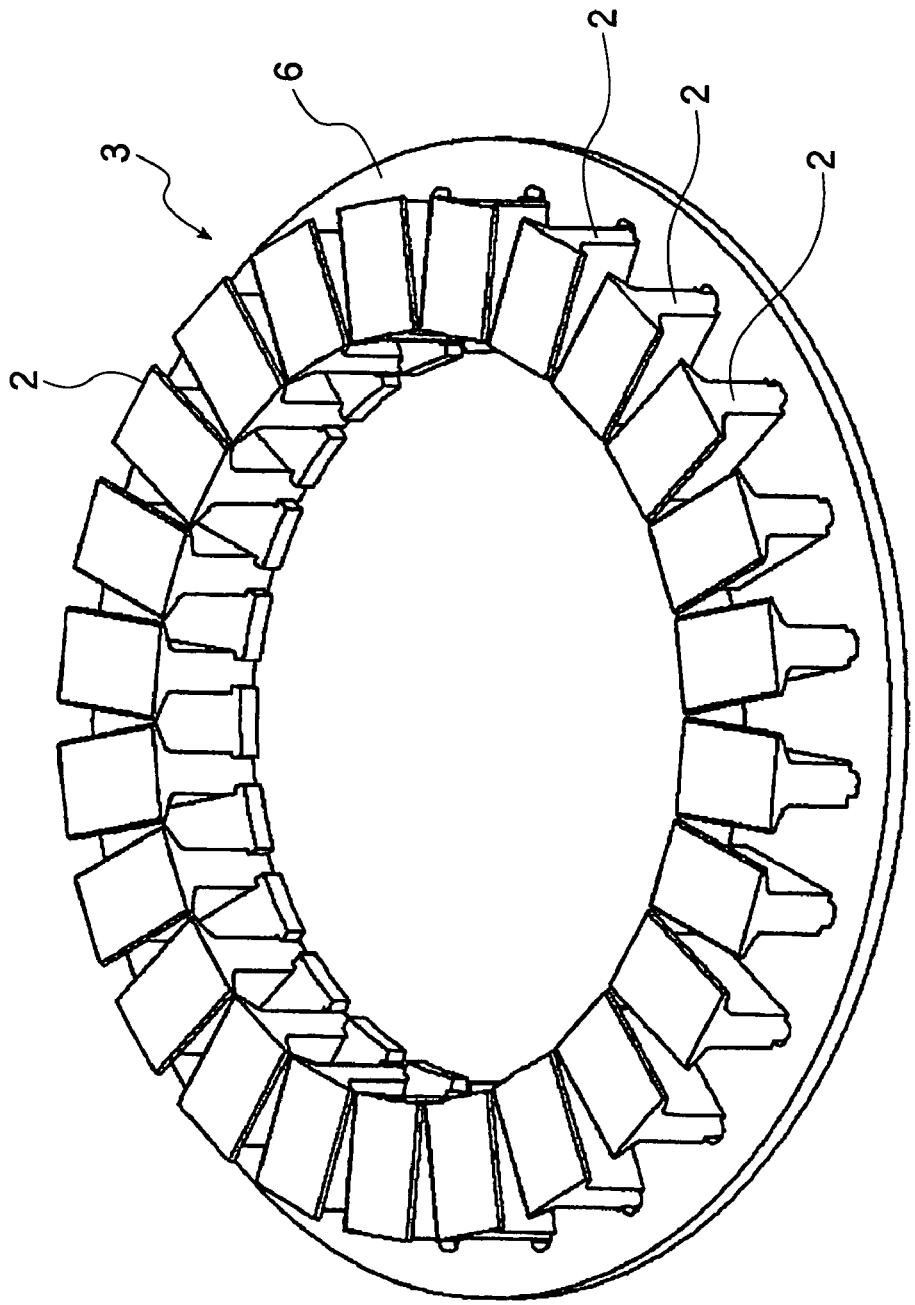
FIG. 17 is a perspective view showing a stator yoke core and teeth of the stator of FIG. 16.
Figure 18:
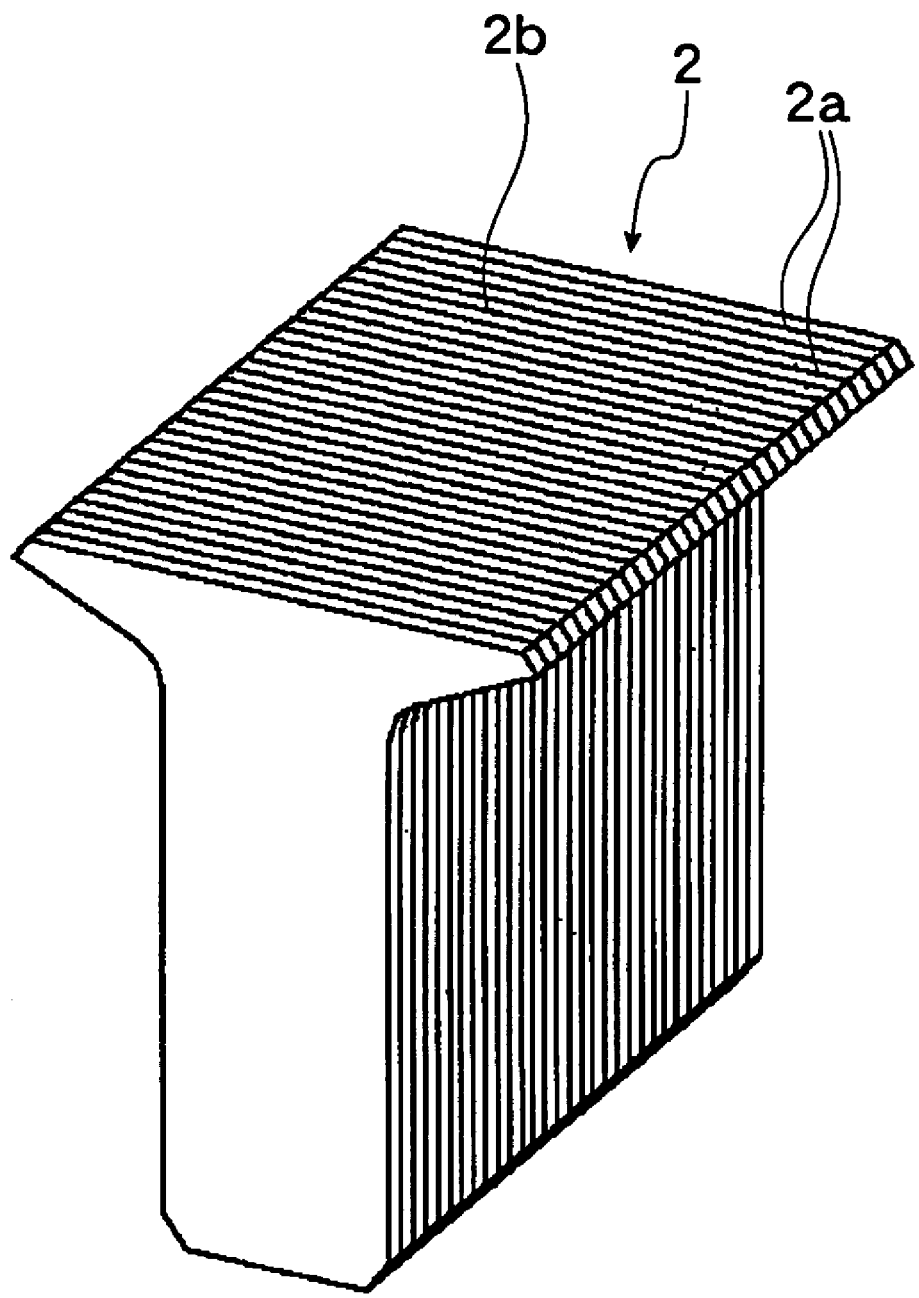
FIG. 18 is a perspective view of the tooth of the conventional structure.
Figure 19:
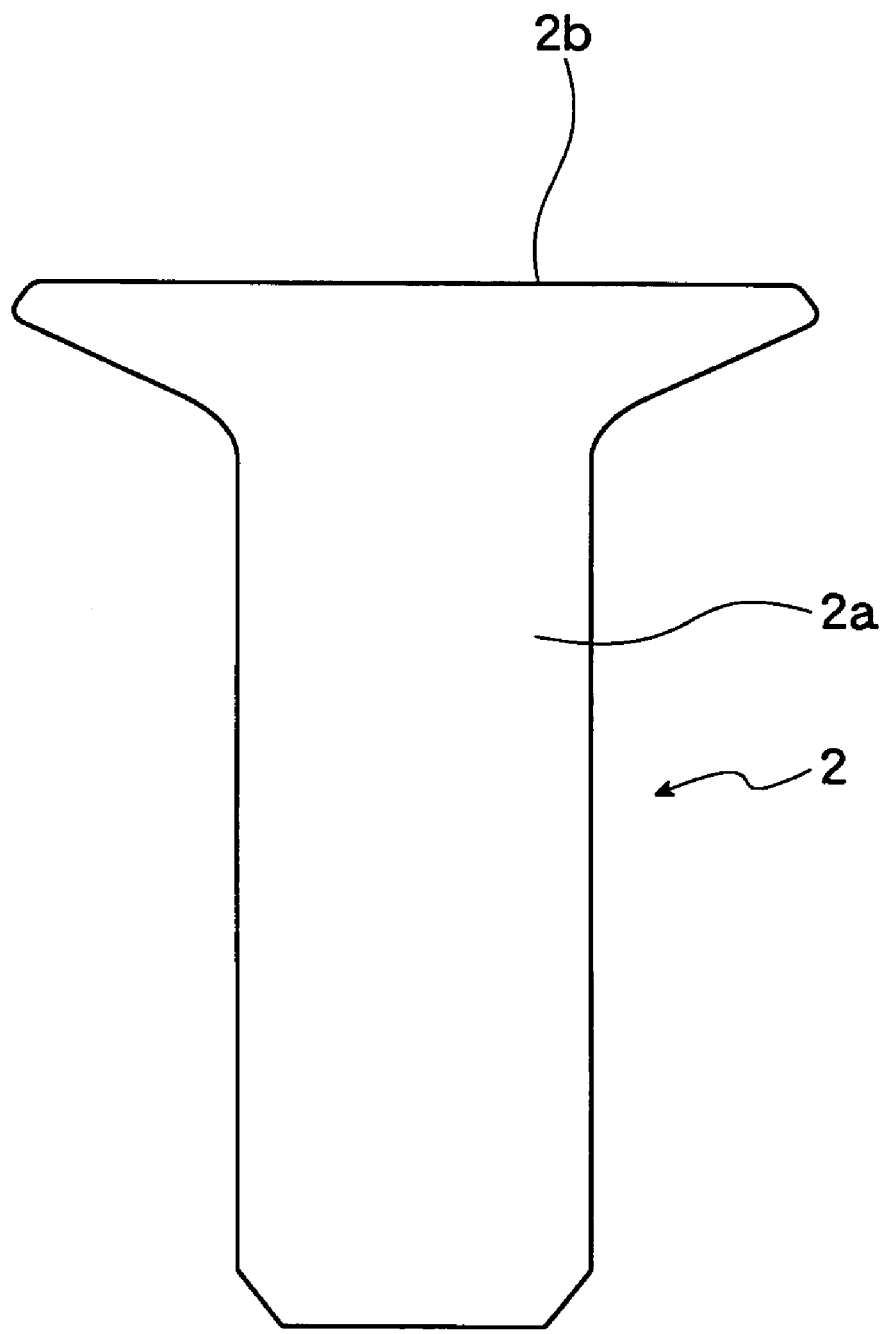
FIG. 19 is a front view of the tooth.

Still furthermore, although in the described embodiments, the portion of the tooth 48 other than the protruded portions 48h of the opposing surface 48a of the tooth is covered by the molding resin 52, these portions may be partially covered by the molding resin as shown in FIG. 15.

What is claimed is:

1. A rotary electric machine comprising:
a stator including a plurality of teeth which are wound up by coils and a stator yoke core connecting the respective teeth; and
a rotor provided with magnets disposed so as to oppose to the teeth, respectively, with a space therebetween, wherein each of the teeth is formed into T shape by laminating a plurality of magnetic steel plates and has a head portion and a leg portion, the head portion being a wider portion of the T-shape which is opposed to the magnet, the leg portion including a coil wind-up portion around which a coil is wound up and which has a substantially constant width and an insert portion which is inserted into the stator yoke core, and the coil wind-up portion is formed with a plurality of fitting portions for fitting and fixing the laminated magnetic steel plates together, the fitting portions being arranged so as to align with a center line of the coil wind-up portion;

wherein the magnetic steel plates have an insulating film formed on both side surfaces thereof other than the fitting portions so that a closed circuit is formed between the magnetic steel plates through the fitting portions.

2. The rotary electric machine according to claim 1, wherein the fitting portion is formed in an area apart from the head portion and the insert portion by not less than a ½ length of a width of the oil wind-up portion.

3. The rotary electric machine according to claim 1, wherein the teeth and the magnets are arranged so as to oppose to each other with a space in a rotation axis direction.

4. The rotary electric machine according to claim 1, wherein the insulating film formed on the side surfaces of the magnetic steel plates is broken at the fitting portion when the fitting portions are formed and fitted to the magnetic steel plates.

5. The rotary electric machine according to claim 1, wherein the fitting portions are formed to the respective magnetic steel plates so as to have protruded portions and recessed portions such that the protruded portion of the fitting portion of one magnetic steel plate is fitted and fixed to the recessed portion of the fitting portion of an adjacent magnetic steel plate when the magnetic steel plates are laminated together.

6. The rotary electric machine according to claim 1, wherein the fitting portions are formed in parallel with the center line of the coil wind-up portion.

7. The rotary electric machine according to claim 1, wherein the fitting portions are formed on the center line of the coil wind-up portion.

8. The rotary electric machine according to claim 1, wherein the fitting portions are each formed as a half pierce portion having a half protruded portion and half recessed portion.

9. The rotary electric machine according to claim 1, wherein the fitting portions are each formed as a V-shaped calking portion.

10. An electric wheelchair comprising:
a frame structure constituting a vehicle body frame;
a seat disposed on the frame structure;
a pair of driving wheel units including two wheels;
an electric motor mounted to each of the paired driving wheel units; and an operation member operatively connected to the electric motor for operating the driving wheel units, wherein the electric motor comprises a rotary electric machine, which comprises a stator including a plurality of teeth which are wound up by coils and a stator yoke core connecting the respective teeth and a rotor provided with magnets disposed so as to oppose to the teeth, respectively, with a space therebetween, in which each of the teeth is formed into T shape by laminating a plurality of magnetic steel plates and has a head portion and a leg portion, the head portion being a wider portion of the T-shape which is opposed to the magnet, the leg portion including a coil wind-up portion around which a coil is wound up and which has a substantially constant width and an insert portion which is inserted into the stator yoke core, and the coil wind-up portion is formed with a plurality of fitting portions for fitting and fixing the laminated magnetic steel plates together, the fitting portions being arranged so as to align with a center line of the coil wind-up portion;

wherein the magnetic steel plates have an insulating film formed on both side surfaces thereof other than the fitting portions so that a closed circuit is formed between the magnetic steel plates through the fitting portions, and wherein the insulating film formed on the side surfaces of the magnetic steel plates is broken at the fitting portion when the fitting portions are formed and fitted to the magnetic steel plates.

* * * * *

UNITED STATES PATENT AND TRADEMARK OFFICE
CERTIFICATE OF CORRECTION

PATENT NO. : 7,528,521 B2 Page 1 of 1
APPLICATION NO. : 11/488976
DATED : May 5, 2009
INVENTOR(S) : Shinya Naitou et al.

It is certified that error appears in the above-identified patent and that said Letters Patent is hereby corrected as shown below:

At column 9, line 8, please delete "oil", and insert --coil--, therefor.

Signed and Sealed this

Twenty-sixth Day of January, 2010

David J. Kappos
*Director of the United States Patent and Trademark Office*